J. P. SMITH.
Potato Digger.
No. 60,273.
Patented Dec. 4, 1866.
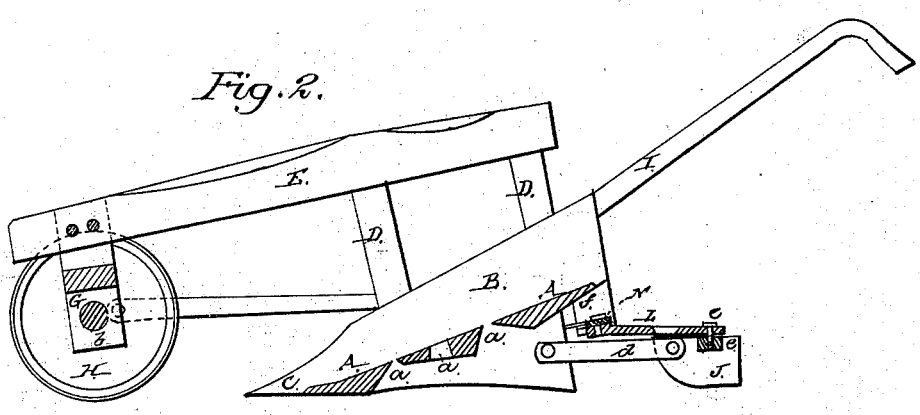
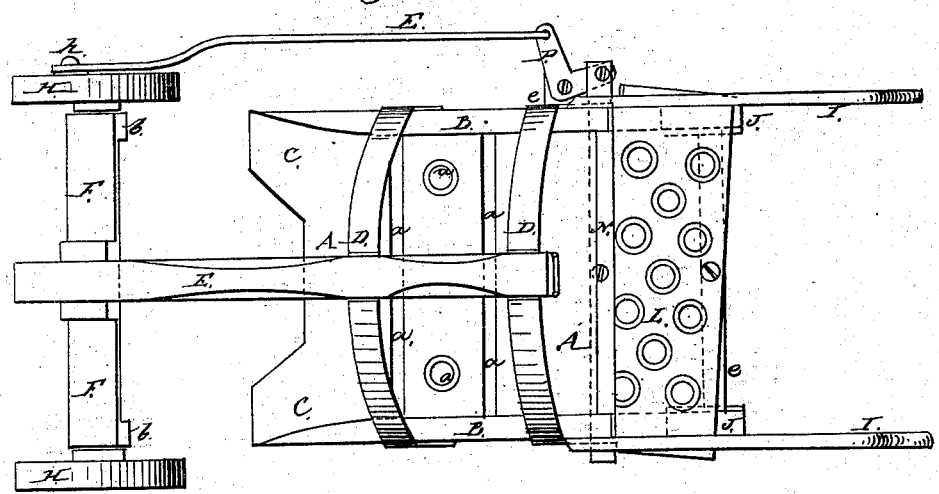

United States Patent Office.

IMPROVEMENT IN POTATO DIGGER.

JOHN P. SMITH, OF HUDSON, NEW YORK.

Letters Patent No. 60,273, dated December 4, 1866; antedated November 22, 1866.

SPECIFICATION.

TO ALL WHOM IT MAY CONCERN:

Be it known that I, JOHN P. SMITH, of Hudson, in the county of Columbia, and State of New York, have invented certain new and useful improvements in Potato Diggers; and I do hereby declare that the following is a full, clear, and exact description of the same, reference being had to the accompanying drawings, making a part of this specification, in which—

Figure 1 is a plan or top view of a potato digger, constructed according to my invention.

Figure 2 is a longitudinal vertical section, taken centrally through fig. 1.

Similar letters of reference indicate corresponding parts in both figures.

This invention consists in a novel construction of a potato digger, whereby the greater portion of the dirt or earth with which the potatoes are intermingled when first taken from the ground is removed therefrom previous to their passage to the shaking or agitating screen, which completes the separation of the dirt or earth from the potatoes and deposits them upon the surface of the ground, by which means a very efficient operation of the digger is obtained with a greatly reduced draught as compared with those heretofore devised.

To enable others to understand the construction and operation of my invention, I will proceed to describe it with reference to the drawings.

A represents a strong inclined screen made of cast iron or other suitable material, and which has fixed upon each of its lateral edges an upright side piece, B. The rearmost lower portions of these side pieces B project below the screen A, and constitute runners which support the rearmost end of the said screen and hold the same in the proper inclined position, while the upper portions of the said side pieces prevent the dirt and potatoes from falling off from the said lateral edges of the screen. Formed in this screen are any suitable number of holes or longitudinal or transverse slots, as represented at $a$, the said holes or slots being of such size and shape as to permit the dirt, but not the potatoes, to pass through them, as will be hereinafter more fully explained. The front or lower end of the screen A, is brought to a sharp edge and has formed upon each side a forwardly projecting share, C, the outer edge of which is joined to the adjacent side piece B, while its inner edge is made inclined or sloping with reference to the front edge of the screen A, as shown more clearly in fig. 1; the sharp front edge of this screen A, with its shares C, ploughs or penetrates into the soil to bring the potatoes to the surface, as will be hereinafter fully set forth. D are arched transverse braces of wrought iron, which extend from one side piece, B, to the other, over the screen A; and fixed securely upon these braces is a longitudinal beam, E, which projects forward in advance of the front edge of the digging screen A. Firmly secured upon the forward end of this beam E is a transverse bar, F, at each end of which is a downwardly projecting lug, $b$. These lugs may be strengthened by a transverse brace, $r$, and have formed in them suitable bearings or boxes for the reception of an axle, G, upon each end of which is rigidly fixed a wheel, H. These wheels H not only operate the shaking or agitating screen, as will be presently explained, but prevent the front or digging edge of the screen A, and its shares, G, from penetrating too deeply into the ground. Projecting back and upward from the rear ends of the side pieces B are two handles, I, by means of which the machine is guided when in operation. Situated behind the two side pieces B are two small runners, J, which are attached to each other by a transverse bar, $c$, and thus constitute a small sled which is secured behind the screen A by links or short bars, $d$, extending from the runners J to the side pieces B, and pivoted at each end to the said runners and side pieces in order to allow the sled to accommodate itself to the uneven surface of the ground. L is the shaking or agitating screen, which is placed upon the sled, $c$ J, with its forward edge a little below the rearmost edge of the screen A, and its rearmost edge pivoted at its centre to the transverse bar $c$, by means of a vertical bolt or pin, as shown at $e$. $f$ are hangers which project downward from the rear ends of the side pieces B, and in each of which is formed a transverse slot. A transverse sliding bar, N, is passed through these slots, so that it is supported at each end by the aforesaid hangers $f$. The forward edge of the shaking screen L is pivoted at its centre to the centre of the sliding bar N, in such manner that the said forward edge of the screen L is suspended from the said sliding bar, and so that a reciprocating motion being given to the sliding bar, the screen L will be vibrated or swung to and fro upon the pivot $e$. This screen L is perforated with a sufficient number of holes of such size as will permit the passage through them of the dirt, but not the potatoes, and has its front edge somewhat higher than its rearmost edge to facilitate the delivery of the potatoes from the said screen to the surface of the ground. Projecting from the outer side of one of the side pieces B is a horizontal lug, $g$, upon which is pivoted a bent lever, P, one arm of which is pivoted to the end of the sliding bar N, while the other arm of the said bent lever is connected, by means of a pitman, R, with a crank pin, $h$, fixed in one of the wheels H, in such manner that the rotation of the said wheels communicates a reciprocating motion to the sliding bar N, and consequently vibrates the shaking screen L upon the pivot $d$, as just hereinbefore mentioned. One or two horses or other draught animals being attached in the ordinary or any suitable way to the forward end of the beam E, the machine is drawn forward with the wheels H astride of a "row" of potatoes, so that the sharp front edge of the inclined screen A ploughs into and through the soil at a depth a little below that at which the potatoes are generally found. The inclined inner edges of the shares C tend to throw the mingled dirt and potatoes inward, so that as the machine advances they slide back and upward upon the inclined surface of the screen A, the greater part of the dirt falling through the holes or slots $a$, which are made too narrow to allow the passage of the potatoes through them; the potatoes, and whatever dirt may not have fallen through the slots $a$, having been forced back to the rear edge of the screen A by the progressive movement of the said screen, fall upon the agitating screen, which, being shaken by the rotation of the wheel H, as hereinbefore fully explained, the remaining dirt is shaken through the holes in the said screen L, while the potatoes, passing back upon the slightly inclined surface thereof, fall from its rearmost edge to the ground. By these means much less power is necessary to separate the potatoes from the dirt than if it was required to shake the whole of the dirt from the potatoes through the screen L.

What I claim as new, and desire to secure by Letters Patent, is—

1. The inclined digging screen A, furnished with shares C, and combined with the shaking screen L, substantially as herein set forth for the purpose specified.

2. The pitman R, cranked lever P, and sliding bar N, arranged in relation with each other and with the shaking screen L, driving-wheel or wheels H, and digging screen A, substantially as herein set forth for the purpose specified.

3. The sled $e$ J, arranged in rear of the digging screen A, and underneath the shaking screen L, substantially as herein set forth for the purpose specified.

4. The arrangement, with reference to the digging screen A, of the arched braces D, beam E, transverse bar F, and wheels H, substantially as herein set forth for the purpose specified.

JOHN P. SMITH.

Witnesses:
    CHAS. H. LOWER,
    JNO. B. LONGLEY.